(No Model.)  2 Sheets—Sheet 1.

G. H. CORMACK.
GRAIN CUTTING MACHINE.

No. 351,312.  Patented Oct. 19, 1886.

Witnesses.
Evans Blake
A. O. Behel

Inventor.
George H. Cormack.
Per Jacob Behel
Atty.

(No Model.) 2 Sheets—Sheet 2.
G. H. CORMACK.
GRAIN CUTTING MACHINE.
No. 351,312. Patented Oct. 19, 1886.
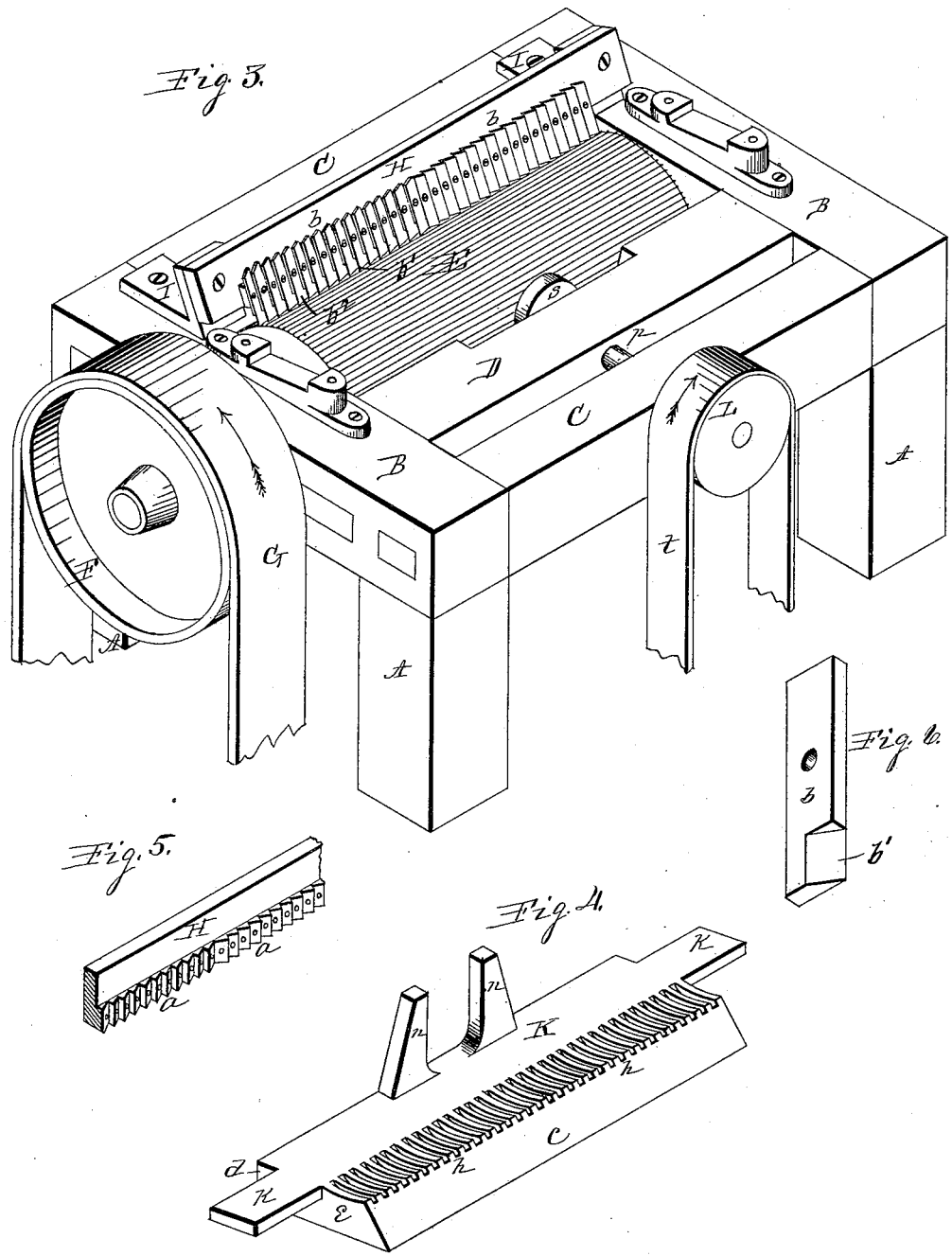

UNITED STATES PATENT OFFICE.

GEORGE H. CORMACK, OF ROCKFORD, ILLINOIS.

GRAIN-CUTTING MACHINE.

SPECIFICATION forming part of Letters Patent No. 351,312, dated October 19, 1886.

Application filed November 18, 1885. Serial No. 183,244. (No model.)

*To all whom it may concern:*

Be it known that I, GEORGE H. CORMACK, a citizen of the United States, residing in the city of Rockford, in the county of Winnebago and State of Illinois, have invented a new and useful Grain-Cutting Machine, of which the following is a specification.

This invention relates to the class of machines employed in the manufacture of cut-meal or grits, in which cutters are employed to divide the grain into sections.

The object of this invention is to produce a machine of a simple and reliable construction, employing knife-edge cutters capable of producing sectional meal by dividing the grains into transverse sections. To accomplish this I have designed and constructed the machine represented in the accompanying drawings, in which—

Figure 1:
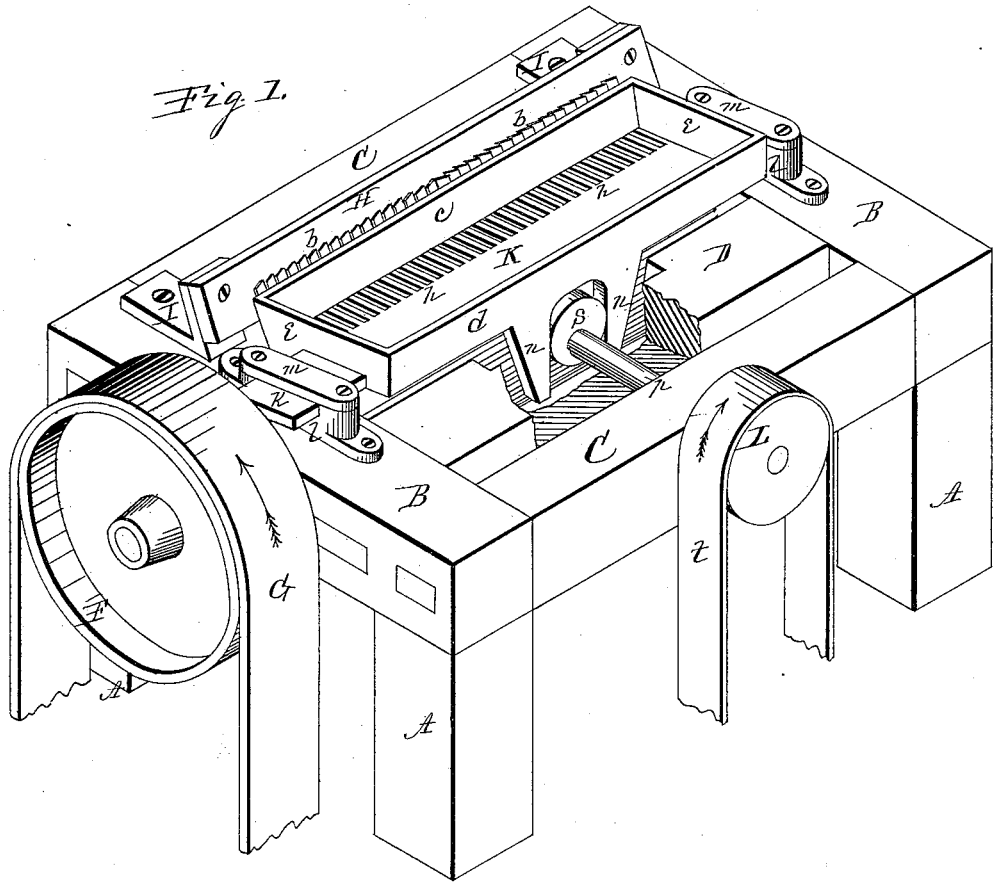
Figure 2:
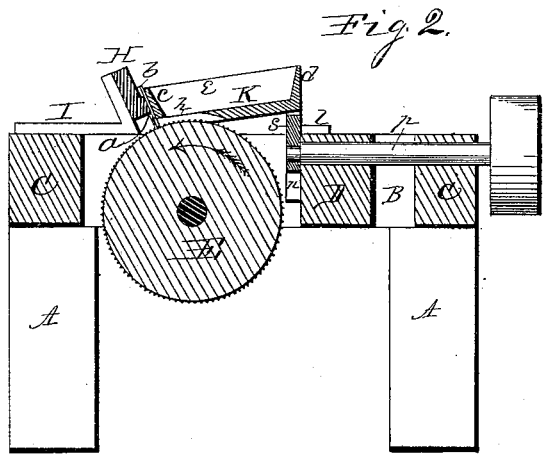

Figure 1 is an isometrical representation of a machine embodying my invention, in which a portion of the frame is cut away to show the cam in its connection with the shoe. Fig. 2 is a vertical central transverse section. Fig. 3 is an isometrical representation of the machine with shoe removed. Fig. 4 is an isometrical under face representation of the shoe. Fig. 5 is an isometrical representation of the cutter-bar with the cutters removed. Fig. 6 is an isometrical representation of a cutter-blade.

The supporting-frame of my improved machine consists of corner-posts A, end beams, B, side beams, C, and an intermediate beam, D, framed and joined in the usual manner in rectangular form. A cylinder, E, having its periphery finely corrugated lengthwise, is mounted within the supporting-frame to revolve on suitable journals in bearings fixed to the frame, and its projecting end journal is provided with a belt-pulley, F, to receive a belt, G, to impart a rotary movement to the cylinder.

A cutter-frame consisting of a cutter-bar, H, and bracket-supports I is fixed to the supporting-frame in such position thereon relatively to the cylinder that its under edge shall overlap or stand above the cylinder. The lower edge portion of the cutter-bar H is formed with an enlarged projecting portion, $a$, produced in saw-toothed form, preferably inclining from the center of its length in opposite directions, as shown at Fig. 5, forming seats for the cutter-blades.

Cutter-blades $b$, having their lower end portions reduced to cutting-edges $b'$ on their face sides, are fixed in place on the inclined face of the saw-toothed portions of the cutter-bar, and depend therefrom nearly to the peripheral surface of the cylinder. The inclination of the cutter-blades relatively to the cutter-bar determines the length of the sections of the grits or cut meal, which will be about equal to the distance between the cutting-edge $b'$ of one blade and the face $b^2$ of the preceding blade.

The shoe is of rectangular box form on its upper side, consisting of a bottom, K, front side wall, $c$, rear side wall, $d$, and end walls, $e$. The outer or front edge of the front side wall, $c$, of the shoe is conformed to the vertical inclination of the cutters, and the forward portion of the under face of its bottom is curved to conform to the periphery of the cylinder.

Grooves $h$ are formed from near the middle to the lower front edge of the inclined shoe, and they extend through the said shoe at its lower curved portion above the cylinder, and are open at the lower front edge of the shoe, as shown in Fig. 4. The shoe is provided with end guide-bars, $k$, which enter end guides, $l$, to place the shoe in working position relatively to the cutters and cylinder, and in a manner to permit of an endwise reciprocating movement in front of the cutters and over the cylinder. Caps $m$ are placed over the guide-bars and guides, and are held in place by screws or bolts passed through the parts. The hoe is provided with arms $n$, depending from its rear under face. A shaft, $p$, is supported to revolve in bearings in the supporting-frame, and its inner end is provided with a cam, $s$, to enter between and engage the inner faces of the arms depending from the shoe. A pulley, L, is fixed on the outward projecting end of the shaft $p$ to receive a belt, $t$, to connect it with the source of power.

It is designed to employ a spout, conveyer, or hopper (not shown in the drawings) to conduct the grain into the shoe.

In the use of my improved machine the cylinder is made to rotate in the direction indicated by the arrow on the belt, and motion is also imparted to the cam, through which the shoe is made to reciprocate over the cylinder and in front of the cutters. The grain in the shoe will enter the grooves in its front lower portion and engage the periphery of the cylinder, and in its rotations in connection with the reciprocating movement of the shoe the grains will be carried forward, mainly endwise, against the cutters, and will be cut into sections about equal in length to the distance between the cutting-edge of one of the cutter-blades and rear or non-cutting edge of the preceding blade, producing a sectional meal or grits, which in the rotations of the cylinder will be discharged from the machine.

I claim as my invention—

1. In a grain-cutting machine, the combination, with a series of inclined cutters and a rotary cylinder, of a reciprocating shoe formed with a series of grooves open at its lower front edge, substantially as described.

2. In a grain-cutting machine, the combination, with a series of inclined cutters and a rotary cylinder, of a reciprocating shoe curved on its under side, inclined forwardly, and formed with a series of grooves open at its front edge, substantially as described.

3. In a grain-cutting machine, the combination, with cutters and a rotary cylinder, of a laterally-reciprocating shoe formed with end guide-bars, guides to receive said bars, arms depending from the shoe, and a cam arranged between said arms, substantially as described.

4. In a grain-cutting machine, the combination, with a series of cutters and a rotary cylinder, of a laterally-reciprocating shoe formed with through grooves or openings, which are open at the lower front edge of the shoe, as described, arms depending from the shoe, and a cam arranged between said arms to impart the necessary lateral reciprocating movement to the shoe, substantially as described.

GEORGE H. CORMACK.

Witnesses:
W. S. BRONSON,
A. O. BEHEL.